United States Patent [19]
Weston et al.

[11] Patent Number: 5,644,317
[45] Date of Patent: Jul. 1, 1997

[54] DUAL POSITIONING LOCATION SYSTEM

[75] Inventors: Richard James Weston, Mesa; Bruce Edward Geren, Chandler, both of Ariz.

[73] Assignee: Motorola, Inc., Schaumburg, Ill.

[21] Appl. No.: 411,354

[22] Filed: Mar. 27, 1995

[51] Int. Cl.⁶ .................. G01S 5/02; G01S 3/02; G01C 21/00
[52] U.S. Cl. .................. 342/357; 342/457; 364/453; 364/454
[58] Field of Search .................. 342/357, 457; 364/453, 454

[56] References Cited

U.S. PATENT DOCUMENTS 5,241,319  8/1993  Shimizu .................. 342/358
5,272,483  12/1993  Kato .................. 342/357

*Primary Examiner*—Gregory C. Issing
*Attorney, Agent, or Firm*—Jeffrey D. Nehr; Bradley J. Botsch, Sr.

[57] ABSTRACT

An automatic vehicle location system (10) includes a radio positioning system receiver (14) which receives GPS radio signals (18) and includes a two-gimbaled gyroscope (22), which is used by a dead-reckoning positioning system. A controller (43) determines position based upon the radio positioning system when the radio signals (18) are available and upon dead-reckoning when the radio signals (18) are not available. The dead-reckoning process is based upon a compensation factor which is established in response to data received from the radio positioning system (14). The compensation factor acts as an adjustment to an inner gimbal angle to compensate for a minor drift away from level by the inner gimbal (32).

19 Claims, 4 Drawing Sheets

5,644,317

DUAL POSITIONING LOCATION SYSTEM

TECHNICAL FIELD OF THE INVENTION

The present invention relates generally to location systems. More specifically, the present invention relates to location systems which rely both upon a radio positioning system and an inertial positioning system to determine location.

BACKGROUND OF THE INVENTION

Radio positioning systems, such as the Global Positioning System (GPS) and others, use radio frequency (RF) signals broadcast from or received at known locations to determine a geographical position of a target object. Great accuracy may be achieved when the RF signals allow a controller which resolves position to gather a sufficient quantity of data. GPS receivers need to receive RF signals from at least three satellites to be able to resolve a position in two dimensions, and accuracy increases as more RF signals are received over longer periods of time.

Unfortunately, radio positioning receivers cannot always receive the needed number of RF signals. For example, when positioning systems are located on vehicles traveling in urban areas, nearby buildings, tunnels, and other obstructions, the various RF signals can be blocked from time to time and prevent the receiver from determining a current position. Consequently, a location system which relies solely upon radio positioning system techniques may be unable to track or continuously provide information describing current positions.

Inertial systems may also be used to determine position. Heading change data may be detected by monitoring a constant inertia device, such as a gyroscope. A controller which resolves position may continuously monitor this heading change data along with speed data and combine these data with other data describing an initial position to track or continuously provide information describing current positions.

Inertial systems can provide current position information when radio positioning systems cannot because inertial systems do not rely upon RF signals which may be blocked by nearby obstructions. Unfortunately, the constant inertia devices, such as gyroscopes and the like, upon which inertial systems rely are error prone. Thus, inertial system position results often become significantly inaccurate.

Constant inertia devices must be manufactured in accordance with exacting processes in order to have a positioning system which approaches a usable degree of accuracy. Mechanical gyroscopes are desirable constant inertia devices to use in vehicles due to their relative insensitivity to temperature changes and their ability to withstand constant minor vibration. However, startup kick, internal friction, and inconsistent road conditions, such as corners, hills, and the like, cause errors which have a tendency to accumulate so that over time unsatisfactory worst case errors are likely to result.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
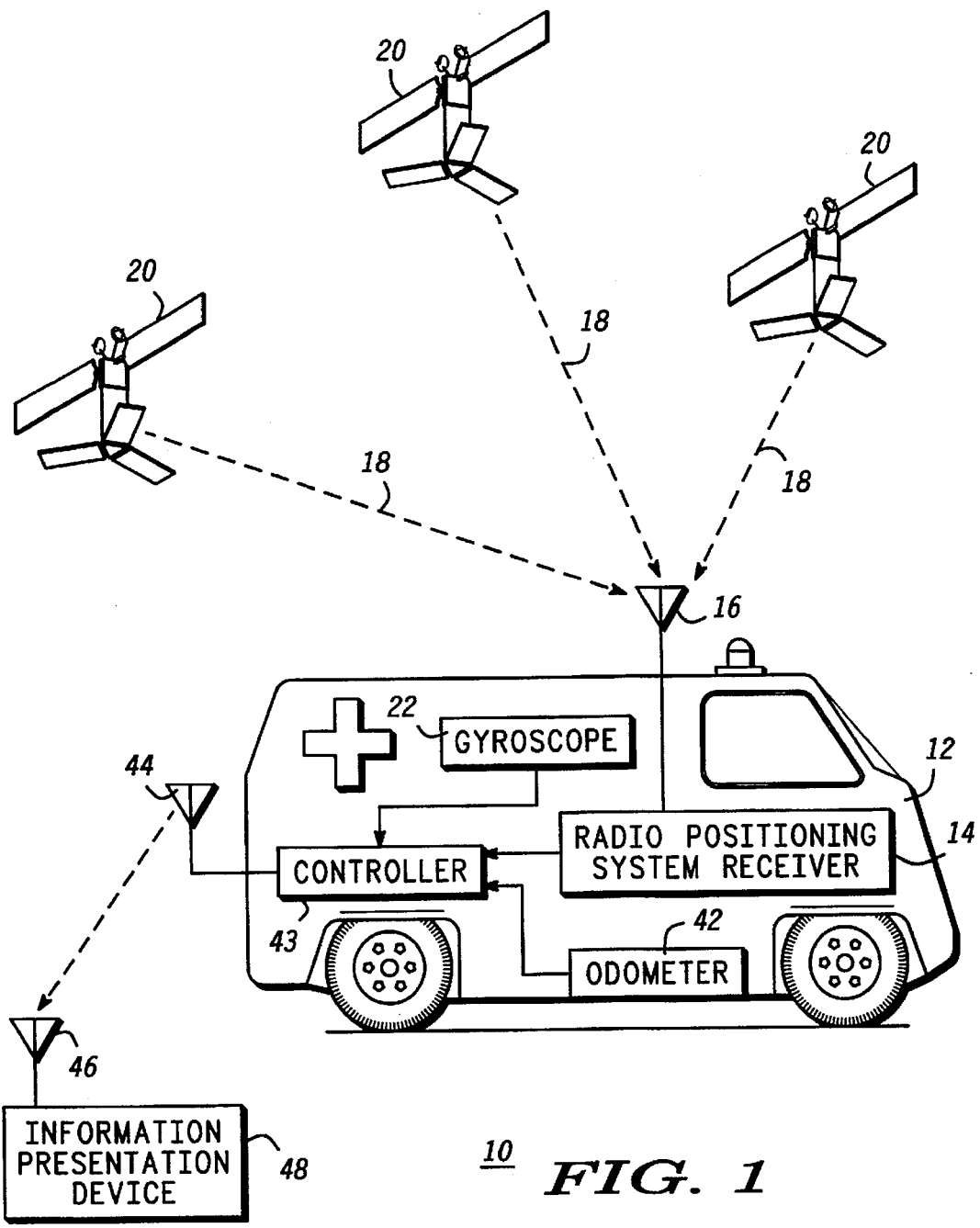
FIG. 1 shows a schematic block diagram of a dual positioning automatic vehicle location system (AVLS)

FIG. 1 shows a schematic block diagram of a dual positioning automatic vehicle location system (AVLS) 10. Location system 10 includes equipment located in a vehicle 12. In the preferred embodiment, vehicle 10 is likely to be an emergency vehicle such as a police car, ambulance, fire engine, or the like. However, the present invention does not require location system 10 to be located in any particular vehicle or mode of transportation.

Location system 10 includes a radio positioning system receiver 14. Through an antenna 16, receiver 14 receives radio frequency (RF) signals 18 broadcast in accordance with a radio positioning system. In the preferred embodiment, RF signals 18 are broadcast from satellites 20, which are a part of the well known Global Positioning System (GPS). Receiver 14 generates receiver signals which convey data describing position, heading, and speed for vehicle 12. While the preferred embodiment utilizes GPS, those skilled in the art will appreciate that other radio positioning systems, including systems in which RF signals are transmitted from vehicle 12 to fixed receiving points, may be used as well.

Figure 2:
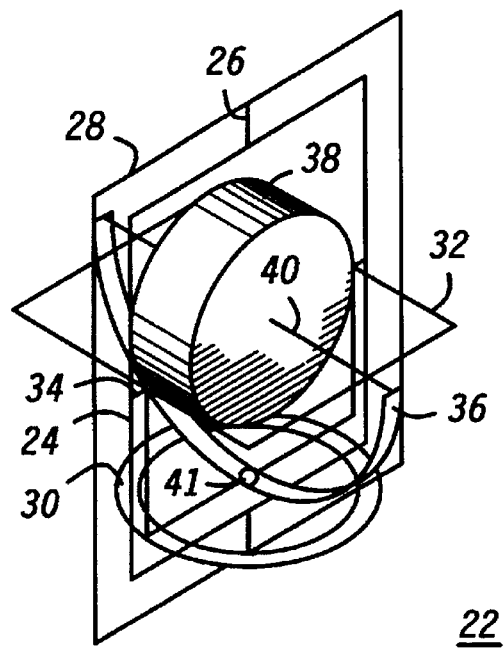
FIG. 2 shows a schematic view of a gyroscope portion of the location system.

Location system 10 additionally includes an inertial positioning system, also known as a dead reckoning system, which includes a two-gimbaled gyroscope 22. FIG. 2 shows a schematic view of a gyroscope 22 used in the preferred embodiments. An outer gimbal 24 rotates on a substantially vertical outer gimbal axis 26 within a frame 28. As outer gimbal 24 rotates, an outer gimbal angle (OG) may be detected from a sensor (not shown) located in an outer gimbal encoder 30. An inner gimbal 32 rotates about a substantially horizontal axis 34 within outer gimbal 24. An inner gimbal angle (IG) may be detected from a sensor (not shown) located in an inner gimbal encoder 36. Within inner gimbal 32, a flywheel 38 spins about a spin axis 40. A pendulum 41 attaches to inner gimbal 32 to provide stabilization. Pendulum 41 causes inner gimbal 32 to reside in a level orientation with respect to the force of gravity. The GyroEngine gyroscope manufactured by Gyration, Inc. of Saratoga, Calif. represents one example of gyroscope 22 illustrated in FIG. 2.

Referring to FIGS. 1 and 2, heading changes for vehicle 12 and for location system 10 mounted therein cause outer gimbal 24 to rotate about axis 26. The angle of rotation is characterized by OG gyroscope signals generated by gyroscope 22. However, unwanted outer gimbal rotation, known as "drift", is influenced by deviations from level in inner gimbal 32. A portion of this deviation is characterized by IG gyroscope signals generated by gyroscope 22. An OG compensation algorithm, discussed below, produces an OG angle adjustment based upon the IG angle.

However, errors in the IG angle with respect to gravity can lead to significant heading errors and inaccuracies in determining position. Unfortunately, the IG angle does not always accurately characterize the IG angle with respect to gravity. Small errors may result from gyroscope friction, road conditions which temporarily cause gyroscope 22 to be mounted in an unlevel orientation, and a startup kick of the gyro motor. Over time, these small errors, if not compensated, can accumulate into significant position determination errors.

Referring to FIG. 1, vehicle 12 includes a mechanical odometer 42 coupled to the running gear of vehicle 12. Odometer 42 provides a signal which conveys the current speed of vehicle 12.

The gyroscope signals from gyroscope 22, the receiver signals from receiver 14, and the odometer signals from odometer 42 are routed to a controller 43. Controller 43 represents a conventional programmable computer, microprocessor, microcontroller, or like device which performs processes and procedures (discussed below) that are defined in software programs stored in a memory (not shown) thereof. Controller 43 determines a location for vehicle 12 based upon the odometer, gyroscope, and receiver signals.

In the preferred embodiment, this location is reported via RF communications through antennas 44 and 46 to a remotely located information presentation device 48. Device 48 may, for example, be located at a dispatching office and may be configured to display, print, store, log, or otherwise record and/or annunciate the location data. When a fleet of vehicles 12 are equipped with location system 10, a dispatcher may dispatch vehicles 12 based upon the location data presented at device 48. Of course, nothing prevents a device 48 from being located in vehicle 12.

Figure 3:
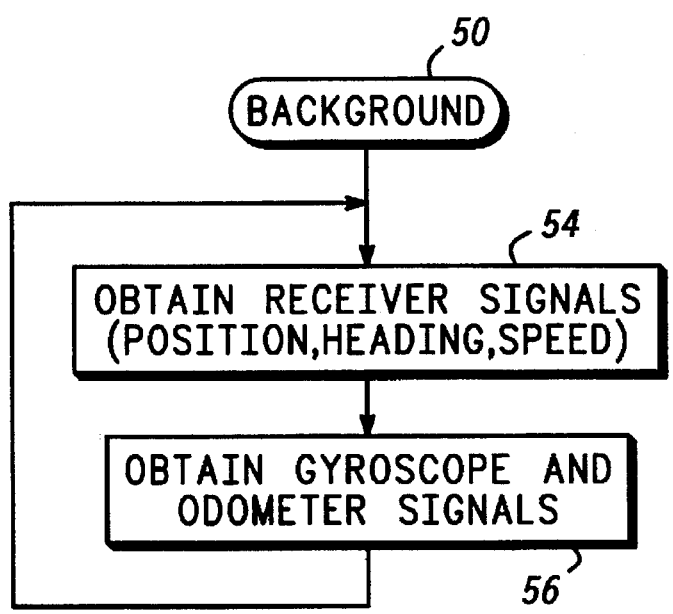
FIG. 3 shows a background procedure performed by a controller portion of the location system.
Figure 4:
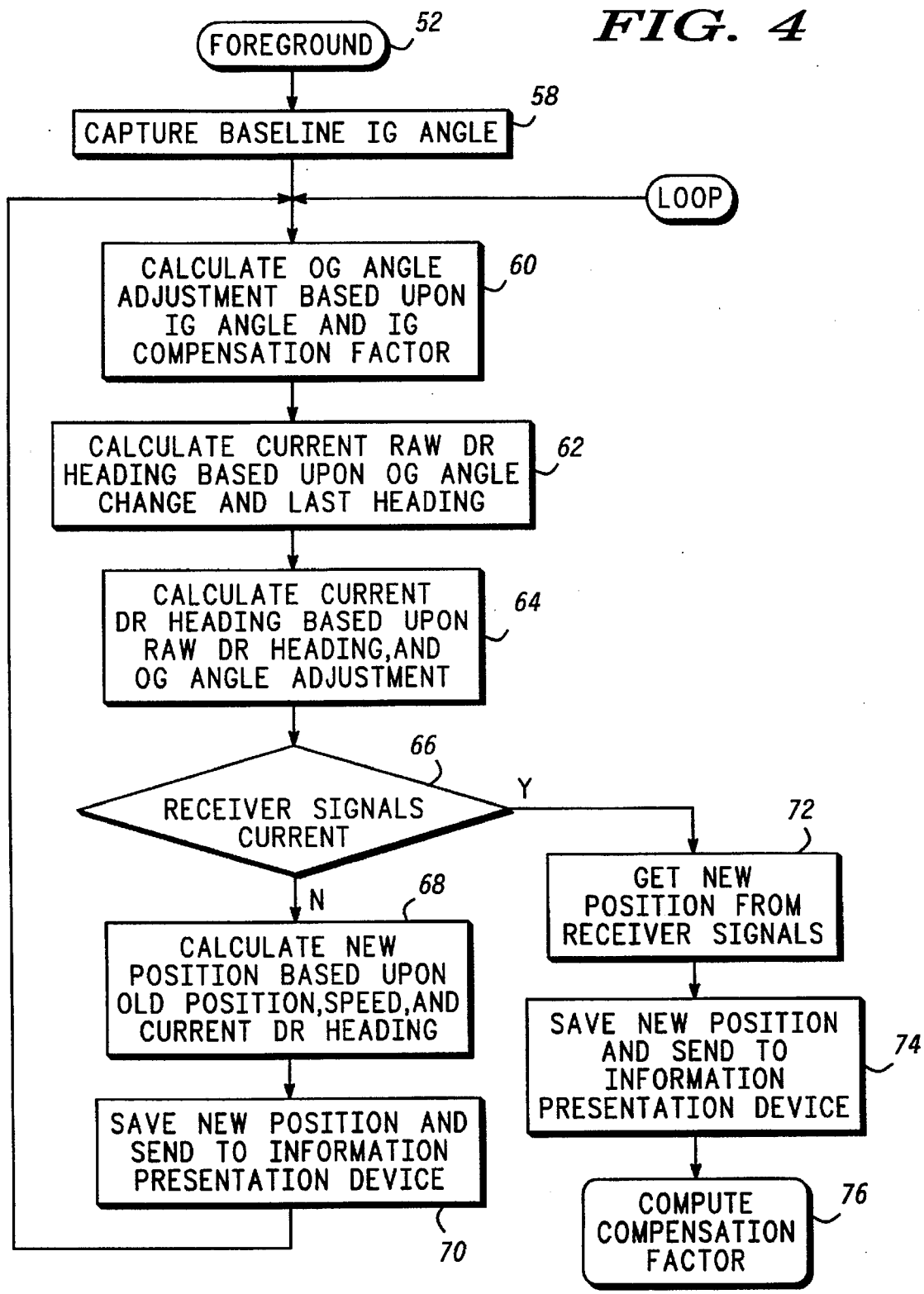
FIG. 4 shows a flow chart of a foreground process performed by the controller.
Figure 5:
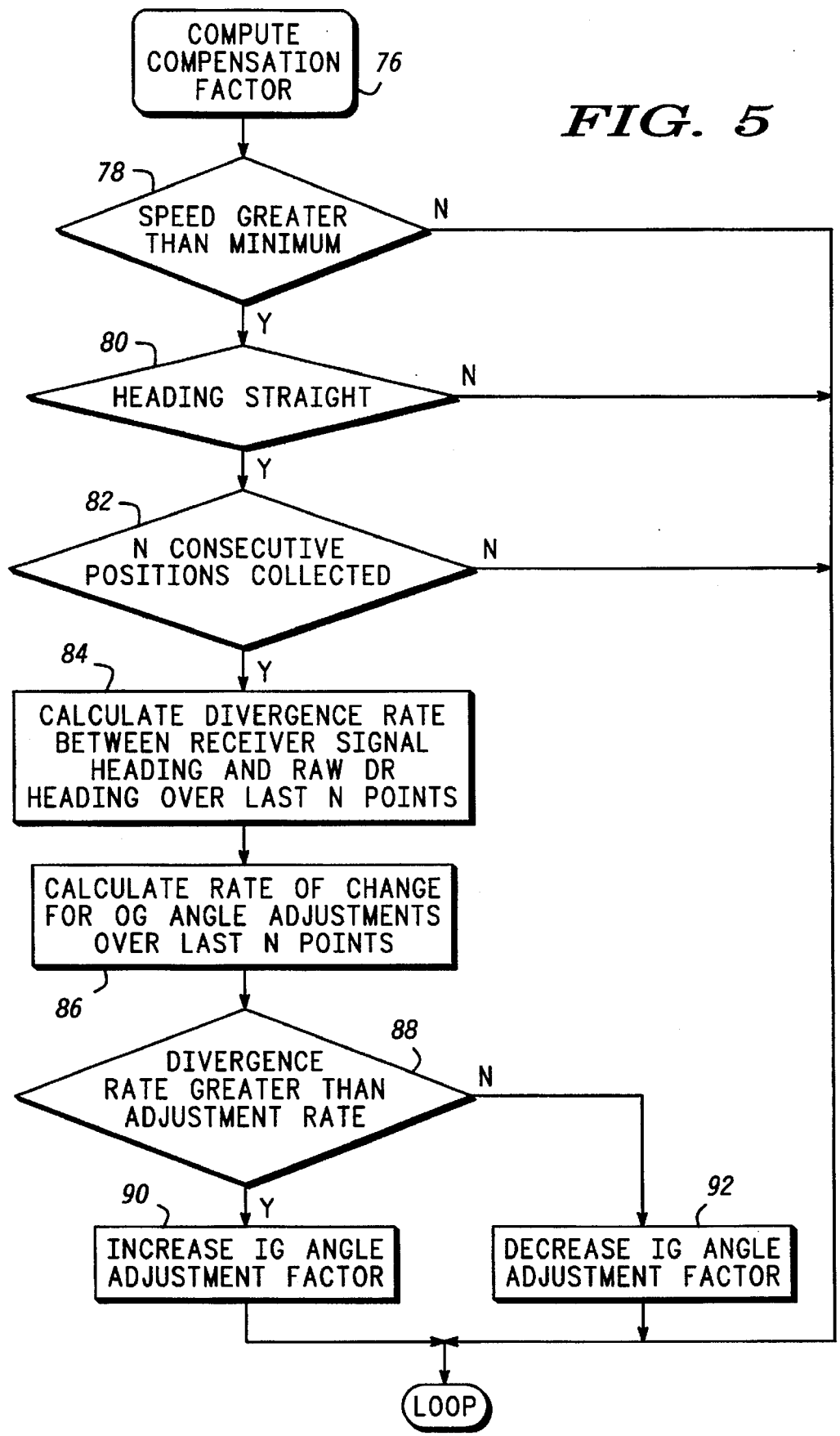
FIG. 5 shows a flow chart of a "compute compensation factor" procedure of the foreground process.

FIGS. 3-5 show flow charts of processes and procedures performed by controller 43 to determine locations for vehicle 12. FIG. 3 shows a background process 50 while FIGS. 4 and 5 relate to a foreground process 52. Background and foreground processes 50 and 52 run independently from one another and, for practical purposes, run concurrently.

Referring to FIG. 3, background process 50 performs a task 54 to obtain the receiver signals from radio positioning system receiver 14. The receiver signals define a current position, current heading, and current speed for vehicle 12 when the radio signals 18 (see FIG. 1) receivable at vehicle 12 permit these parameters to be determined. The receiver signals additionally convey data that indicate whether the signals 18 receivable at vehicle 12 permit a current evaluation of the position, heading, and speed parameters. Further references to position will include position, heading, and speed parameters.

After task 54, background process 50 performs a task 56 to obtain the gyroscope signals and the odometer signals. The gyroscope signals communicate an IG angle change and an OG angle change. In the preferred embodiment, the gyroscope signals are active only when IG and OG angle changes are taking place. The odometer signal conveys current vehicle speed. Task 56 may additionally translate gyroscope signals into angle data and accumulate angle change until the data are retrieved by foreground process 52. Likewise, task 56 may integrate or average speed data obtained from odometer 42 until the data are retrieved by foreground process 52.

After task 56, program control loops back to task 54. Preferably, background process 50 is implemented in a tight programming loop so that process 50 accurately tracks all signals from receiver 14, gyroscope 22, and odometer 42. Over a period of time, process 50 may gather a plurality of points or positions from receiver 14 and any number of heading and speed changes from gyroscope 22 and odometer 42. In the preferred embodiment, radio positioning system receiver 14 may generate data at a slower rate than process 50 loops. For example, receiver 14 may produce data only once a second. Several iterations of task 54 may fail to obtain receiver signals for each iteration of task 54 which successfully obtains receiver signals. Process 50 remains active so long as location system 10 is operating in vehicle 12.

FIG. 4 shows a flow chart of foreground process 52. Process 52 is initiated as soon as location system 10 is powered up in vehicle 12. Process 52 performs a task 58 to capture a baseline IG angle from gyroscope 22. Desirably, program control remains at task 58 as long as possible to allow gyroscope 22 to reach its steady state speed and to stabilize. Program control may, for example remain at task 58 until vehicle 12 begins to move, as determined by monitoring odometer 42.

The IG angle captured in task 58 will be used as a definition of level or 0° so long as location system 10 remains powered up. However, as discussed below, a compensation factor is calculated to adjust the IG angle and refine the definition of level as location system 10 operates.

After task 58, a task 60 calculates and saves an OG angle adjustment based upon the IG angle and the IG compensation factor, as follows:

$$OG_{adj} = K * TAN(IG + CF).$$

$OG_{adj}$ is the OG angle adjustment. K is a constant provided by the manufacturer of gyroscope 22 (see FIG. 2) and is determined in response to the mass of pendulum 41, and the mass, size, and rotational speed of flywheel 38. CF is the IG compensation factor, which is determined in response to a plurality of prior receiver signals. The IG compensation factor adjustment is discussed below in connection with FIG. 5. The compensation factor may be obtained at task 58 by reading a variable from memory.

After task 60, a task 62 calculates and saves a current "raw" dead reckoning (DR) heading based upon an OG angle change and the last heading. In other words, task 62 alters a previously known heading for vehicle 12 to a current heading which differs from the previously known heading by the cumulative OG angle change detected since the previously known heading was determined.

Next, a task 64 calculates and saves a current DR heading based upon the raw DR heading determined above in task 62 and upon the OG angle adjustment ($OG_{adj}$) determined above in task 60. Task 64 may add the raw DR heading to the OG angle adjustment to arrive at the current DR heading.

After task 64, a query task 66 determines whether the receiver signals from receiver 14 (see FIG. 1) are providing current position, heading, and speed data. If these parameters are not current, then foreground process 52 determines a position in response to the gyroscope signals and the compensation factor (CF) discussed above in connection with task 60.

In particular, when the receiver signals do not convey current data, a task 68 calculates a new position based upon an old position previously saved in memory, a speed parameter obtained from odometer 42 (see FIG. 1) through task 56 (see FIG. 3), and the current DR heading calculated above in task 64.

As discussed above, the DR heading is calculated in response to the OG adjustment ($OG_{adj}$), which is calculated in response to the IG compensation factor (CF), and the compensation factor (CF) is determined in response to prior receiver signals. Consequently, the dead-reckoning position determined in task 68 is based upon a compensation factor calculated using data obtained from a radio positioning system. This improves accuracy compared to the accuracy achievable using a dead-reckoning system alone. Moreover, the improved accuracy results even when radio signals 18 (see FIG. 1) are receivable at vehicle 12 only occasionally. Those skilled in the art will appreciate that task 68 performs conventional trigonometric calculations in determining the new position.

After task 68, a task 70 saves the new position in memory and sends the new position to information presentation device 48 (see FIG. 1). This saved position may or may not be used in the next iteration of task 68 to update the position of vehicle 12.

When task 66 determines that the receiver signals from receiver 14 describe a current position, heading, and speed, process 52 uses the receiver signals rather than dead-reckoning calculations. In particular, program control proceeds from task 66 to a task 72. Task 72 takes whatever actions may be needed, if any, to get a new position from receiver signals 18. In accordance with the preferred embodiment, which relies upon the GPS, data from receiver 14 describes an absolute position which may not require further refinement or translation.

After task 72, a task 74 saves the new position in memory and sends the new position to information presentation device 48 (see FIG. 1). Desirably, task 74 saves the new position in the same memory variable used by task 68 as the source of an old position upon which dead-reckoning position calculations are based. The new position saved in task 74 may overwrite position data calculated using dead-reckoning techniques and written in task 70. Thus, dead-reckoning position errors may be corrected from time to time when radio positioning signals are adequate for position determination.

After task 74, program control proceeds to a "compute compensation factor" procedure 76, a flow chart of which is presented in FIG. 5. Generally, procedure 76 evaluates the location data received from receiver 14 over a recent predetermined period of time to determine whether conditions are favorable for correctly modifying the compensation factor (CF) so that future compensated IG angles will more closely describe deviations from the direction of gravity. When the conditions are favorable, procedure 76 makes an appropriate modification. Modifications are made so that over time the compensation factor (CF) converges toward an optimum value.

Referring to FIG. 5, procedure 76 performs a query task 78 to determine whether the speed of vehicle 12 is greater than a predetermined minimum speed. If the speed is too low, program control loops back to task 60 (see FIG. 4) through the "loop" connector to repeat the positioning process. No modification of the compensation factor will take place because in this situation modification is as likely to cause the compensation factor (CF) to diverge from its optimum value as to converge toward its optimum value. In this situation, conditions are not favorable for modifying the compensation factor (CF) because heading data provided by radio positioning system receiver 14 (see FIG. 1) are not sufficiently accurate. In the preferred embodiment, this minimum speed is around 5 Km/Hr.

When task 78 determines that the speed is greater than the minimum, a query task 80 determines whether the heading of vehicle 12 is approximately straight. In the preferred embodiment, task 80 determines whether any heading changes are within a predetermined angle, such as 1° for example, of a previous heading. If the heading is not approximately straight, program control loops back to task 60 (see FIG. 4) to repeat the positioning process. No modification of the compensation factor will take place because in this situation modification is as likely to cause the compensation factor (CF) to diverge from its optimum value as to converge toward its optimum value. In this situation, conditions are not favorable for modifying the compensation factor (CF) because the dynamic nature of a turn causes instantaneously inaccurate heading data from both gyroscope 22 and radio positioning system receiver 14.

When task 80 determines that the heading of vehicle 12 is approximately straight, a query task 82 determines whether "N" distinct, consecutive positions or points have been collected from radio positioning system receiver 14, where N is an integer number desirably greater than two. In the preferred embodiment N equals 9. If fewer than N positions have been collected, program control loops back to task 60 (see FIG. 4) to repeat the positioning process. No modification of the compensation factor will take place because in this situation modification is as likely to cause the compensation factor (CF) to diverge from its optimum value as to converge toward its optimum value. In this situation, conditions are not favorable for modifying the compensation factor (CF) because the headings obtained from dead-reckoning and from the radio positioning system are noisy. Thus, decisions based upon any single set of points are likely to be in error, but basing decisions upon multiple sets of points washes out noise and reduces the likelihood of error.

When task 82 determines that N consecutive positions have been collected, procedure 76 concludes that conditions are favorable for modifying the compensation factor (CF), and a task 84 is performed. Using the radio positioning system heading data from N consecutive positions and corresponding raw heading data from the dead-reckoning calculations discussed above in connection with FIG. 4, task 84 calculates a divergence rate. Generally, task 84 identifies whether the raw DR heading is tending toward the right or left of the radio positioning system heading.

In the preferred embodiment, task 84 determines the radio positioning system heading throughout the period of time represented by the N positions. The raw DR headings over the same period of time are also identified from previous iterations of task 62 (see FIG. 4), and the difference between the radio positioning system heading data and the raw DR heading data are determined. Using conventional curve fitting techniques, such as least squares, a straight line is identified which matches this difference over the subject period of time. The slope of this straight line characterizes the divergence rate of the two headings.

After task 84, a task 86 calculates a rate of change for the OG angle adjustment ($OG_{adj}$) over substantially the same period of time. Task 86 may resolve this rate of change by fitting a straight line to the OG angle adjustments ($OG_{adj}$) from previous iterations of task 60 (see FIG. 4) and taking the slope of this straight line.

Next, a query task 88 compares the divergence rate determined above in task 84 with the rate of change determined above in task 86. If the divergence rate is greater than the rate of change in the OG angle adjustment ($OG_{adj}$), a task 90 increases the IG angle adjustment compensation factor (CF). If the divergence rate is less than the rate of change, a task 92 decreases the compensation factor (CF). After task 90 or 92, program control loops back to task 60 (see FIG. 4) to repeat the positioning process.

In the preferred embodiment, tasks 90 and 92 update the compensation factor (CF) in steps of approximately 0.005°. Thus, any single iteration of procedure 76 makes only a small modification to the compensation factor (CF).

However, over the course of numerous iterations of procedure 76, the compensation factor (CF) converges toward an optimum value wherein the rate of change in the OG angle adjustment (OGadj) tracks the divergence between dead-reckoning and radio positioning system headings.

Although not shown, task 88 may also test to determine whether the divergence rate and rate of change are within predetermined upper and lower bounds of one another. If the divergence rate and rate of change are within predetermined bounds, procedure 76 may refrain from modifying the compensation factor (CF).

In summary, the present invention provides an improved location system. A dual positioning location system which relies upon both a radio positioning system and a dead-reckoning system is provided. The radio positioning system need not be continuously available. However, when it is available, it compensates for minor offsets from level of an inner gimbal in a gyroscope used by the dead-reckoning system in order to improve the dead-reckoning accuracy.

The present invention has been described above with reference to preferred embodiments. However, those skilled in the art will recognize that changes and modifications may be made in these preferred embodiments without departing from the scope of the present invention. For example, the controller, gyroscope, and radio positioning system receiver described herein as being separate components may be integrated together. Moreover, the precise tasks and task sequencing described herein are subject to a wide degree of equivalent alternates which accomplish substantially the same processes described herein. These and other changes and modifications which are obvious to those skilled in the art are intended to be included within the scope of the present invention.

What is claimed is:

1. A method for operating a location system having a gyroscope with inner and outer gimbals and having a radio positioning system receiver, said method comprising the steps of:

obtaining receiver signals from said radio positioning system receiver and gyroscope signals from said gyroscope;

identifying a speed for said location system;

computing a compensation factor in response to said receiver signals, said computing step being performed when said receiver signals define a current heading for said radio positioning system receiver wherein said computing step is performed when said identifying step identifies said speed as being greater than a predetermined minimum speed; and determining, when receiver signals do not define a current heading, a position in response to said gyroscope signals and in response to said compensation factor.

2. A method as claimed in claim 1 wherein:

said gyroscope signals characterize an inner gimbal angle and an outer gimbal angle; and said computing step configures said compensation factor as an adjustment to said inner gimbal angle.

3. A method as claimed in claim 1 additionally comprising the step of operating an information presentation device in response to said position determined in said determining step.

4. A method as claimed in claim 1 additionally comprising the steps of:

identifying whether said location system has been on an approximately straight heading for a predetermined period of time; and performing said computing step when said identifying step identifies said approximately straight heading.

5. A method as claimed in claim 1 wherein:

said receiver signals define a plurality of positions over a period of time; and said computing step is responsive to said plurality of positions.

6. A method as claimed in claim 1 additionally comprising the step of receiving radio signals broadcast from Global Positioning System satellites at said radio positioning system receiver.

7. A method as claimed in claim 1 wherein:

said method additionally comprises the step of mounting said location system in a vehicle having an odometer; and said determining step is responsive to signals generated by said odometer.

8. A method as claimed in claim 1 wherein said computing step comprises the steps of:

determining a first heading throughout a first period of time in response to said receiver signals;

determining a second heading throughout approximately said first period of time in response to said gyroscope signals; and calculating a divergence rate between said first and second headings.

9. A method as claimed in claim 8 wherein heading changes for said location system cause outer gimbal angle changes in said gyroscope, an amount of change reflected in said outer gimbal angle is influenced by deviations from level of said inner gimbal, and said calculating step further comprises the steps of:

determining a compensation angle adjustment to said outer gimbal angle, said compensation angle adjustment being responsive to an inner gimbal angle and said compensation factor;

resolving a rate of change for said compensation angle adjustment over approximately said first period of time; and comparing said rate of change for said compensation angle adjustment with said divergence rate.

10. A method for operating a location system having a gyroscope with inner and outer gimbals and having a radio positioning system receiver, said method comprising the steps of:

a) obtaining receiver signals from said receiver and gyroscope signals from said gyroscope;

b) determining whether said receiver signals define a current heading for said location system;

c) determining a speed for said location system;

d) determining whether said location system has been on an approximately straight heading for a predetermined period of time;

e) updating a compensation factor in response to said receiver signals if said receiver signals define a current heading for said location system, said speed is greater than a predetermined minimum speed, and said location system has been on an approximately straight heading for said predetermined period of time; and f) determining a position for said location system in response to said gyroscope signals and in response to said compensation factor.

11. A method as claimed in claim 10 additionally comprising the step of operating an information presentation device in response to said position determined in said step f).

12. A method as claimed 10 additionally comprising the step of refraining from updating said compensation factor when said receiver signals do not define a current heading for said location system, said speed is less than said predetermined minimum speed, or said location system has not been on an approximately straight heading for said predetermined period of time.

13. A method as claimed in claim 10 wherein:

said gyroscope signals characterize an inner gimbal angle and an outer gimbal angle; and said step e) comprises the step of configuring said compensation factor as an adjustment to said inner gimbal angle.

14. A method as claimed in claim 10 wherein:

said method additionally comprises the step of mounting said location system in a vehicle having an odometer; and said step f) comprises the step of determining a position from signals generated by said odometer.

15. A method as claimed in claim 10 wherein:

said method additionally comprises the step of mounting said location system in a vehicle having an odometer; and said step c) comprises the step of determining said speed from signals generated by said odometer.

16. A method as claimed in claim 10 wherein said step e) comprises the steps of:

determining a first heading throughout a first period of time in response to said receiver signals;

determining a second heading throughout approximately said first period of time in response to said gyroscope signals; and calculating a divergence rate between said first and second headings.

17. A method as claimed in claim 16 wherein heading changes for said location system cause outer gimbal angle changes in said gyroscope, an amount of change reflected in said outer gimbal angle is influenced by deviations from level of said inner gimbal, and said step e) further comprises the steps of:

determining a compensation angle adjustment to said outer gimbal angle, said compensation angle adjustment being responsive to an inner gimbal angle and said compensation factor;

resolving a rate of change for said compensation angle adjustment over approximately said first period of time;

comparing said rate of change for said compensation angle adjustment with said divergence rate; and incrementing said compensation factor in response to said comparing step.

18. A dual positioning location system comprising:

a gyroscope with inner and outer gimbals, said gyroscope being configured to produce gyroscope signals;

a radio positioning system receiver configured to produce receiver signals;

means for identifying a speed for said dual positioning location system; and a controller, coupled to said gyroscope and said receiver, for computing a compensation factor in response to said receiver signals when said receiver signals define a current heading and when said speed is greater than a predetermined minimum speed, and for determining a position in response to said gyroscope signals and in response to said compensation factor when said receiver signals do not define a current heading.

19. A dual positioning location system as claimed in claim 18 wherein:

said gyroscope signals characterize an inner gimbal angle and an outer gimbal angle; and said controller configures said compensation factor as an adjustment to said inner gimbal angle.

* * * * *